US006538759B1

(12) United States Patent
Hiraishi et al.

(10) Patent No.: US 6,538,759 B1
(45) Date of Patent: Mar. 25, 2003

(54) NON-REPRODUCIBLE IMAGE FORMATION PREVENTING APPARATUS AND IMAGE FORMATION APPARATUS

(75) Inventors: Junji Hiraishi, Kyoto (JP); Kiyoshi Imai, Kyoto (JP); Takashi Kakiuchi, Kyoto (JP); Keitaro Taniguchi, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/325,774

(22) Filed: Jun. 4, 1999

(30) Foreign Application Priority Data

Jun. 4, 1998 (JP) .............................. 10-155836

(51) Int. Cl.[7] .............................. G06K 15/02; G06F 3/12
(52) U.S. Cl. ..................... 358/1.14; 399/38; 399/234; 399/366; 283/902; 380/51; 382/217; 382/218; 235/379; 209/534
(58) Field of Search .................. 358/1.14; 399/366, 399/2.34, 38; 283/902; 380/51; 382/217, 218; 235/379; 209/534; 356/71

(56) References Cited

U.S. PATENT DOCUMENTS 5,947,255 A * 9/1999 Shimada et al. ............ 194/207
6,307,963 B1 * 10/2001 Nishida et al. ............. 382/190
6,388,767 B1 * 5/2002 Udagawa et al. ............ 358/1.9

FOREIGN PATENT DOCUMENTS

| EP | 0 366 399    | 5/1990  |
| EP | 0 488 796 A1 | 6/1992  |
| EP | 0 522 768    | 1/1993  |
| EP | 0 558 340 A1 | 9/1993  |
| JP | 6-245064     | 12/1992 |

* cited by examiner

Primary Examiner—Edward Coles
Assistant Examiner—Alan Rahimi
(74) Attorney, Agent, or Firm—Dickstein Shapiro Morin & Oshinsky LLP

(57) ABSTRACT

An non-reproducible image formation preventing apparatus has a recognition section, a storage section and a comparison/determination section. The recognition section performs recognition processing for received image data, determines whether or not the image data is an non-reproducible image, and outputs the determination result to an image formation section. The storage section stores non-reproducible image data recognized as an non-reproducible image by the recognition section. The comparison/determination section compares the non-reproducible image data stored in the storage section with an image based on input image data given through an image process section and finding a match degree therebetween. If either of the comparison/determination section and the recognition section determines that the image is an non-reproducible image, a detection signal is sent to the image formation section for stopping normal print. Since the data is digital data, stored non-reproducible images are also stable and a determination can be made at high speed.

20 Claims, 15 Drawing Sheets

FIG. 4A

| (0, 0) | (0, 1) | (0, 2) | (0, 3) | (0, 4) | (0, 5) | (0, 6) | (0, 7) |
|---|---|---|---|---|---|---|---|
| (1, 0) | (1, 1) | (1, 2) | (1, 3) | (1, 4) | (1, 5) | (1, 6) | (1, 7) |
| (2, 0) | (2, 1) | (2, 2) | (2, 3) | (2, 4) | (2, 5) | (2, 6) | (2, 7) |
| (3, 0) | (3, 1) | (3, 2) | (3, 3) | (3, 4) | (3, 5) | (3, 6) | (3, 7) |
| (4, 0) | (4, 1) | (4, 2) | (4, 3) | (4, 4) | (4, 5) | (4, 6) | (4, 7) |
| (5, 0) | (5, 1) | (5, 2) | (5, 3) | (5, 4) | (5, 5) | (5, 6) | (5, 7) |
| (6, 0) | (6, 1) | (6, 2) | (6, 3) | (6, 4) | (6, 5) | (6, 6) | (6, 7) |
| (7, 0) | (7, 1) | (7, 2) | (7, 3) | (7, 4) | (7, 5) | (7, 6) | (7, 7) |

| (0, 0) | (0, 2) | (0, 4) | (0, 6) |
|---|---|---|---|
| (2, 0) | (2, 2) | (2, 4) | (2, 6) |
| (4, 0) | (4, 2) | (4, 4) | (4, 6) |
| (6, 0) | (6, 2) | (6, 4) | (6, 6) |

| (0, 0) | (0, 1) | (0, 2) | (0, 3) | (0, 4) | (0, 5) | (0, 6) | (0, 7) |
|---|---|---|---|---|---|---|---|
| (1, 0) | (1, 1) | (1, 2) | (1, 3) | (1, 4) | (1, 5) | (1, 6) | (1, 7) |
| (2, 0) | (2, 1) | (2, 2) | (2, 3) | (2, 4) | (2, 5) | (2, 6) | (2, 7) |
| (3, 0) | (3, 1) | (3, 2) | (3, 3) | (3, 4) | (3, 5) | (3, 6) | (3, 7) |
| (4, 0) | (4, 1) | (4, 2) | (4, 3) | (4, 4) | (4, 5) | (4, 6) | (4, 7) |
| (5, 0) | (5, 1) | (5, 2) | (5, 3) | (5, 4) | (5, 5) | (5, 6) | (5, 7) |
| (6, 0) | (6, 1) | (6, 2) | (6, 3) | (6, 4) | (6, 5) | (6, 6) | (6, 7) |
| (7, 0) | (7, 1) | (7, 2) | (7, 3) | (7, 4) | (7, 5) | (7, 6) | (7, 7) |

| (0, 0) | (0, 1) | (0, 2) | (0, 3) | (0, 4) | (0, 5) | (0, 6) | (0, 7) |
|---|---|---|---|---|---|---|---|
| (1, 0) | (1, 1) | (1, 2) | (1, 3) | (1, 4) | (1, 5) | (1, 6) | (1, 7) |
| (2, 0) | (2, 1) | (2, 2) | (2, 3) | (2, 4) | (2, 5) | (2, 6) | (2, 7) |
| (3, 0) | (3, 1) | (3, 2) | (3, 3) | (3, 4) | (3, 5) | (3, 6) | (3, 7) |
| (4, 0) | (4, 1) | (4, 2) | (4, 3) | (4, 4) | (4, 5) | (4, 6) | (4, 7) |
| (5, 0) | (5, 1) | (5, 2) | (5, 3) | (5, 4) | (5, 5) | (5, 6) | (5, 7) |
| (6, 0) | (6, 1) | (6, 2) | (6, 3) | (6, 4) | (6, 5) | (6, 6) | (6, 7) |
| (7, 0) | (7, 1) | (7, 2) | (7, 3) | (7, 4) | (7, 5) | (7, 6) | (7, 7) |

FIG. 8

| TIME | FIRST | SECOND | THIRD | FOURTH | FIFTH | SIXTH |
|---|---|---|---|---|---|---|
| DETERMINATION RESULT OF RECOGNITION SECTION | NON-REPRODUCIBLE | REPRODUCIBLE | NON-REPRODUCIBLE | NON-REPRODUCIBLE | REPRODUCIBLE | NON-REPRODUCIBLE |
| CONTROL OF IMAGE PROCESS SECTION | STORE | NOT STORE | STORE | STORE (UPDATE) | NOT STORE | STORE (UPDATE) |
| DATA STORED IN STORAGE AREA 17a | IMAGE 1 | HOLD IMAGE 1 | HOLD IMAGE 1 | UPDATE TO IMAGE 4 | HOLD IMAGE 4 | HOLD IMAGE 4 |
| DATA STORED IN STORAGE AREA 17b | INITIAL VALUE | INITIAL VALUE | HOLD IMAGE 3 | HOLD IMAGE 3 | HOLD IMAGE 3 | UPDATE TO IMAGE 6 |

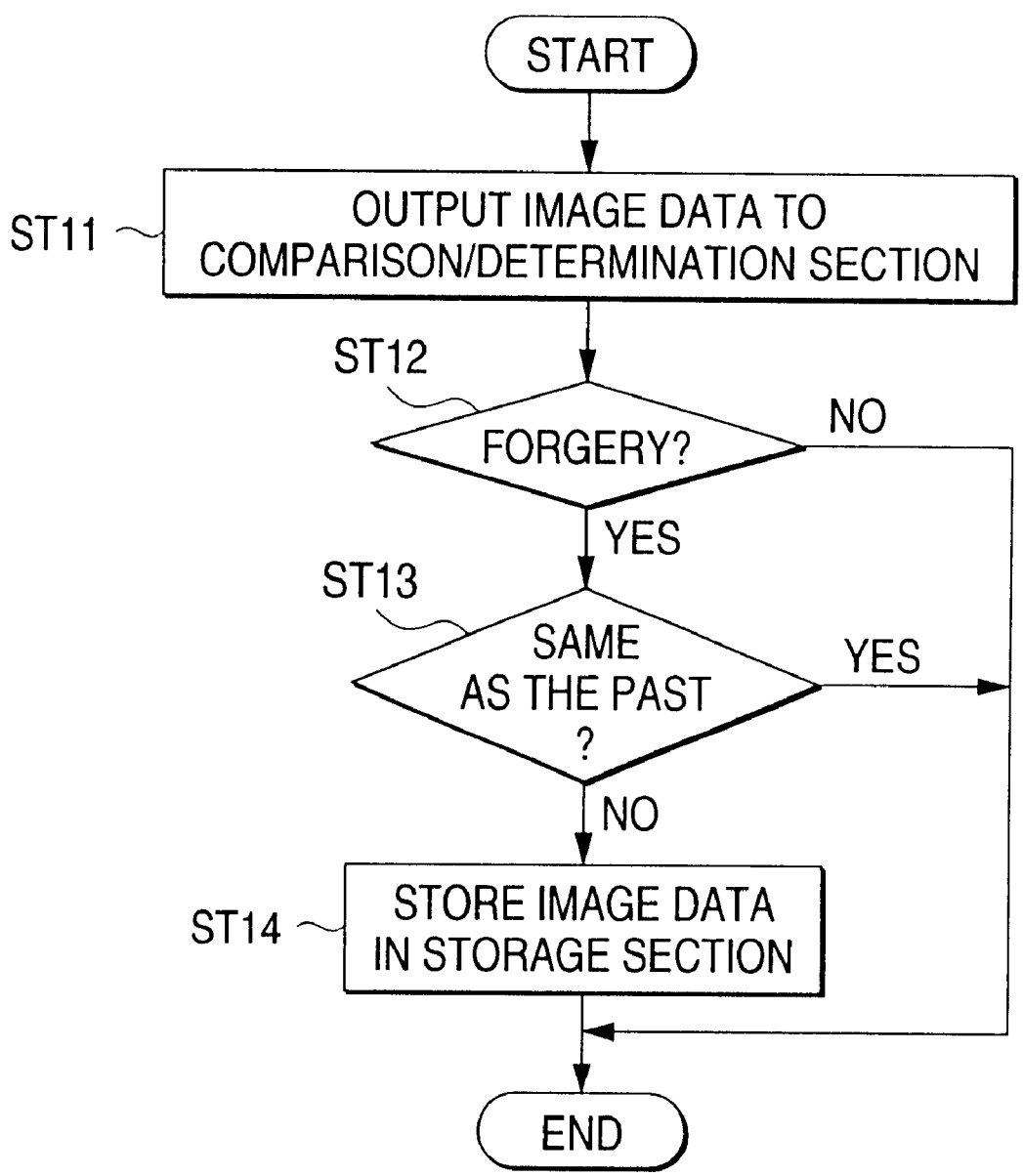

FIG. 10

| TIME | FIRST | SECOND | THIRD | FOURTH | FIFTH | SIXTH |
|---|---|---|---|---|---|---|
| DETERMINATION RESULT OF RECOGNITION SECTION | NON-REPRODUCIBLE | REPRODUCIBLE | NON-REPRODUCIBLE | NON-REPRODUCIBLE | REPRODUCIBLE | NON-REPRODUCIBLE |
| DETERMINATION RESULT OF COMPARISON/ DETERMINATION SECTION | (MISMATCH) | MISMATCH | MISMATCH | MATCH | MISMATCH | MISMATCH |
| CONTROL OF IMAGE PROCESS SECTION | STORE | NOT STORE | STORE | NOT STORE | NOT STORE | STORE |
| DATA STORED IN STORAGE AREA 17a | IMAGE 1 | HOLD IMAGE 1 | HOLD IMAGE 1 | HOLD IMAGE 1 | HOLD IMAGE 1 | HOLD IMAGE 6 |
| DATA STORED IN STORAGE AREA 17b | INITIAL VALUE | INITIAL VALUE | HOLD IMAGE 3 | HOLD IMAGE 3 | HOLD IMAGE 3 | HOLD IMAGE 3 |

FIG. 13

| TIME | FIRST | SECOND | THIRD | FOURTH | FIFTH | SIXTH |
|---|---|---|---|---|---|---|
| DETERMINATION RESULT OF RECOGNITION SECTION | NON-REPRODUCIBLE | REPRODUCIBLE | NON-REPRODUCIBLE | REPRODUCIBLE | NON-REPRODUCIBLE | NON-REPRODUCIBLE |
| DETERMINATION RESULT OF COMPARISON/ DETERMINATION SECTION | (MISMATCH) | MISMATCH | MISMATCH | MISMATCH | MISMATCH | MISMATCH |
| CONTROL OF IMAGE PROCESS SECTION | STORE | NOT STORE | STORE | NOT STORE | STORE | STORE |
| DATA STORED IN STORAGE AREA 17e | PRIMARY BUFFER TEMPORARILY HOLD IMAGE 1 | HOLD BUFFER HOLD IMAGE 1 | HOLD BUFFER HOLD IMAGE 1 | HOLD BUFFER HOLD IMAGE 1 | HOLD BUFFER HOLD IMAGE 1 | PRIMARY BUFFER TEMPORARILY HOLD IMAGE 6 |
| DATA STORED IN STORAGE AREA 17f | HOLD BUFFER INITIAL VALUE | PRIMARY BUFFER TEMPORARILY HOLD IMAGE 2 | PRIMARY BUFFER HOLD IMAGE 3 | HOLD BUFFER HOLD IMAGE 3 | HOLD BUFFER HOLD IMAGE 3 | HOLD BUFFER HOLD IMAGE 3 |
| DATA STORED IN STORAGE AREA 17g | HOLD BUFFER INITIAL VALUE | HOLD BUFFER INITIAL VALUE | HOLD BUFFER HOLD IMAGE 3 | PRIMARY BUFFER TEMPORARILY HOLD IMAGE 4 | PRIMARY BUFFER HOLD IMAGE 5 | HOLD BUFFER HOLD IMAGE 5 |

NON-REPRODUCIBLE IMAGE FORMATION PREVENTING APPARATUS AND IMAGE FORMATION APPARATUS

BACKGROUND OF THE INVENTION

1. Field of the Invention

The present invention relates to an non-reproducible image formation preventing apparatus and an image formation apparatus.

2. Description of the Related Art

As color copiers become sophisticated and pervasive, it has been becoming a problem that unauthorized duplication of copy-inhibited products such as bills and securities is performed. For countermeasures for overcoming the problem, various techniques are developed in addition to the art proposed in Unexamined Japanese Patent Publication (kokai) No. Hei. 6-245064, etc., for example. That is, predetermined recognition processing is performed for read image data and whether or not the image data is a copy-inhibited product such as a bill is determined. If the image data is a copy inhibited product, normal copy processing is inhibited.

By the way, recent personal computers have become inexpensive and sophisticated, and the capacities of hard disk and memory installed therein are growing. Further, the color laser printer connected to a personal computer realizes high image quality and cost reduction. Resultantly, an environment in which an unauthorized copy can be made without using an expensive copier is ready. That is, an image of a bill, etc., is input to a personal computer through an image scanner, and image processing is executed in the personal computer. The resultant image is printed on a color laser printer, whereby an act equivalent to an unauthorized duplication act using a color copier is enabled.

Particularly, a color printer is suitable for mass production of forged articles in such a manner that the same image is printed consecutively in batch processing. Moreover, the color printer has a feature that once a master image is prepared, mass production is possible. Further, color copiers can be checked for installation locations because they undergo periodic inspection, etc., but such a maintenance system is not constructed for color printers; the color copiers involve peculiarity that a forging act at more general locations is feared.

Then, a system using a personal computer needs also be provided with an non-reproducible image formation preventing function similar to that of a copier. In this case, simply, an image recognition processing apparatus similar to that installed in the copier may be installed in a color printer. Recognition processing may be performed for image data provided from the personal computer. If a copy-inhibited image, etc., is detected, normal printout may be stopped.

However, the color printer is inexpensive as compared with the color copier, thus it is difficult to install expensive recognition means in the color printer and it is not practical to use the recognition means with the color printer as it is. If software, etc., is used to reduce costs of the recognition means, the recognition time is increased and the normal print time is prolonged; the effect on the essential function becomes large. Moreover, it may be said that because the apparatus for preventing forgery is installed because of the presence of a small number of persons performing an illegal act, the apparatus is a function not profitable for most users. Therefore, the costs of the recognition means are reduced, of course; in addition, degradation of the printer function needs to be avoided as much as possible. Of course, if the recognition rate is lowered, it is feared that printout of a copy-inhibited article may be allowed in error, thus the recognition rate needs to be held high to some extent.

SUMMARY OF THE INVENTION

It is an object of the invention to provide an non-reproducible image formation preventing apparatus which can determine whether or not given image data is image data to be detected accurately in a short time as a whole without dropping the recognition rate in a simple configuration and moreover does not prolong the processing time required for image formation of print, etc., and is provided at low costs and an image formation apparatus installing the non-reproducible image formation preventing apparatus.

According to the present invention, an non-reproducible image formation preventing apparatus, which is installed in an image formation apparatus for executing image conversion of received image data in an image processing section and printing out an image based on provided image information, comprises recognition means, storage means, comparison means and determination means. The recognition means performs recognition processing for the received image data, determines whether or not the image data is an non-reproducible image, and outputs the determination result to the image formation apparatus. The storage means stores non-reproducible image data recognized as an non-reproducible image by said recognition means. The comparison means compares the non-reproducible image data stored in said storage means with image data based on input image data. The determination means determines whether or not the input image is an non-reproducible image based on an output of said comparison means and outputs the determination result to the image formation apparatus stopping means for stopping normal print processing if a received image is an non-reproducible image based on the determination result output from the non-reproducible image formation preventing apparatus.

An image formation apparatus according to the present invention comprises the above non-reproducible image formation preventing apparatus and stopping means for stopping normal print processing if a received image is an non-reproducible image based on the determination result output from the non-reproducible image formation preventing apparatus.

BRIEF DESCRIPTION OF THE DRAWINGS

In the accompanying drawings:

FIGS. 4A and 4B are drawings to describe the function of a process section in FIG. 3;

FIGS. 6A and 6B are drawings to describe the function of the process section in FIG. 3;

FIG. 8 is a state transition diagram in the second embodiment of the invention;

FIG. 9 is a flowchart to describe the function of an image process section as the main part of a third embodiment of the invention;

FIG. 10 is a state transition diagram in the third embodiment of the invention;

FIG. 13 is a state transition diagram in the fifth embodiment of the invention;

DETAILED DESCRIPTION OF THE INVENTION

Figure 1:
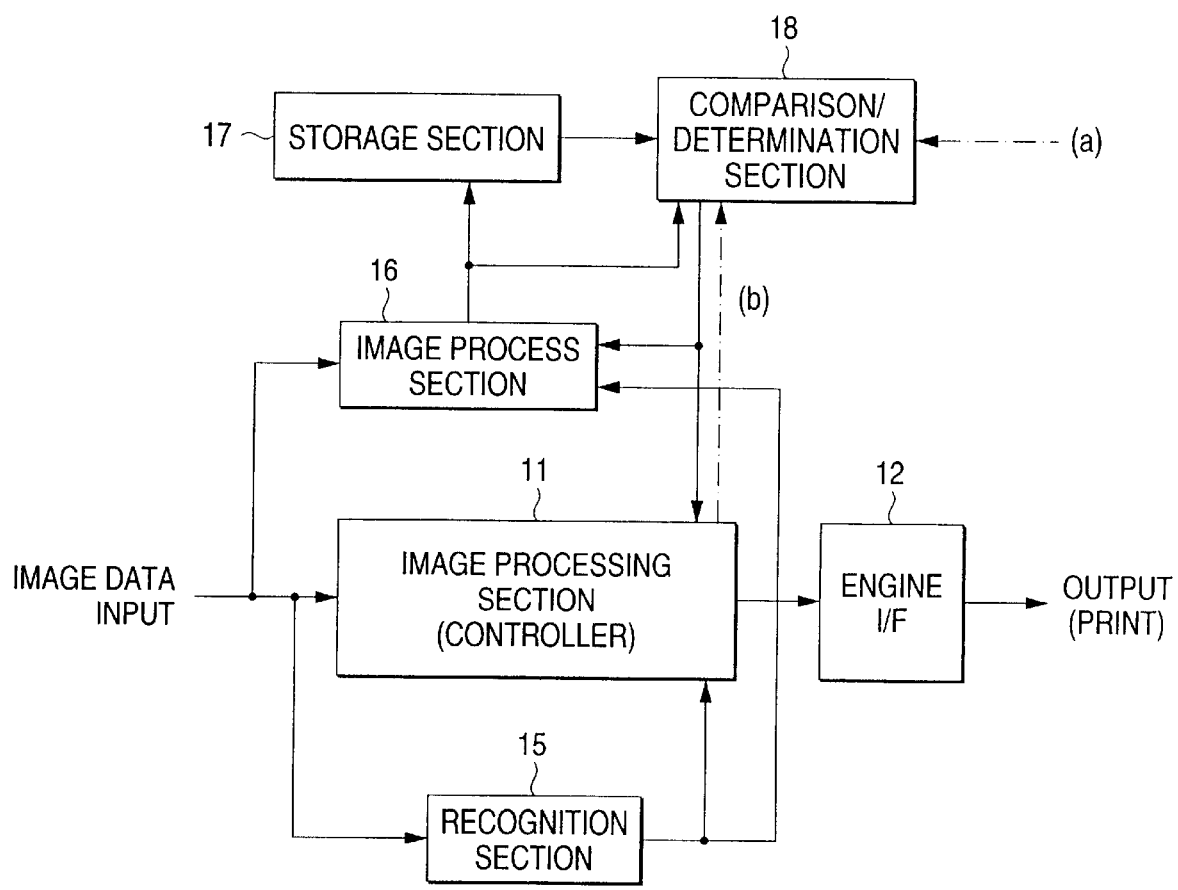
FIG. 1 is a block diagram to show a first embodiment of the invention.

The present invention will be described in detail as follows.

According to the present invention, there is provided an non-reproducible image formation preventing apparatus installed in an image formation apparatus for executing image conversion of received image data in an image processing section and printing out an image based on provided image information. The non-reproducible image formation preventing apparatus has a recognition section, a storage unit, a comparison unit and a determination unit. The recognition section performs recognition processing for the received image data, determines whether or not the image data is an non-reproducible image, and outputs the determination result to the image formation apparatus. The storage unit stores non-reproducible image data recognized as an non-reproducible image by the recognition section (in the embodiments, "storage section," "storage areas"). The comparison unit compares the non-reproducible image data stored in the storage unit with image data based on input image data. The determination unit determines whether or not the input image is an non-reproducible image based on output of the comparison unit and outputting the determination result to the image formation apparatus.

In the embodiments, the comparison unit and the determination unit are provided in one piece as the comparison/determination section 18. The recognition section is provided, for example, by software. Accordingly, although the processing speed becomes low, the recognition accuracy can be held high and costs are reduced, thus the non-reproducible image formation preventing apparatus can also be installed reasonably in an inexpensive image formation apparatus, such as a printer. Various image recognition methods used so far can be adopted as the recognition algorithm of the recognition section. For example, there is a method of extracting a specific mark or pattern existing in image data to determine that the image data is an non-reproducible image to be detected can be used.

If the recognition processing speed of the recognition section is low, the image data once recognized as an non-reproducible image is stored in the storage unit. If the same image is later sent, whether or not the image matches the non-reproducible image data stored in the storage unit is determined. Therefore, a determination can be made at comparatively high speed. Since the processing is to determine whether or not they match, simple determination processing is only required, thus if the recognition section is provided by hardware, costs are not increased. Particularly, when a forging act is conducted, the same original is printed in a large amount. Thus, if an attempt is made to print the second sheet and later, an illegal act is detected based on the non-reproducible image data stored in the storage unit and can be prevented from being conducted. That is, the invention is useful for protecting against forgery. Of course, a forging act conducted on the first sheet can also be detected by the recognition section and can be blocked.

The non-reproducible image stored in the storage unit and input image data to be compared by the comparison unit may be image data not processed or may be processed image data whose amount is reduced appropriately as defined below.

Preferably, the storage unit has a plurality of storage areas for storing a plurality of non-reproducible images. Consequently, the stored non-reproducible image data is increased, so that the objects that can be detected in a short time more reliably are increased, an illegal act can be detected reliably, and prevention processing against non-reproducible image formation can be performed. Particularly, if non-reproducible images are printed on both sides of a sheet such as a bill, a plurality of storage areas are provided so that the non-reproducible images on both sides can be stored.

More preferably, the image stored in the storage unit is replaced with the most recent non-reproducible image. Accordingly, the non-reproducible image to be attempted to print in a large amount for conducting a forging act can be stored and the illegal act can be detected reliably.

If an non-reproducible image detected by the recognition unit is already stored in the storage unit, the image in the storage unit is not updated. Thus, different types of non-reproducible images are stored in the storage areas and the storage areas can be used effectively.

On the other hand, the number of storage areas of the storage unit for storing non-reproducible images may be $2^{n-1}$. Therefore, effective memory management can be executed.

The storage unit may be made up of a primary buffer for temporarily storing received image data and hold sections each for storing an non-reproducible image. According to this configuration, the current input image data undergoing image formation processing is stored in the primary buffer. Thus, if the recognition section recognizes the image data as an non-reproducible image, the image data stored in the primary buffer may be stored in any hold section as non-reproducible image, thus data rewrite, etc., is facilitated. If the recognition section detects an non-reproducible image, preferably the primary buffer is set to a hold section and any of the hold sections is used as a new primary buffer. Particularly in this configuration, the primary buffer can be used as a hold section intact (in the embodiments, "hold buffer"), so that the need for transferring image data from the primary buffer to one of the hold sections can be eliminated, simplifying the processing.

On the other hand, the non-reproducible image formation preventing apparatus may further include process unit for reducing the data amount of the input image data, and the image data compressed by the process unit may be stored in the storage unit. To reduce the data amount, for example, various types of compression can be executed or various methods of thinning out, averaging, conversion to monochrome, etc., can be adopted. The process unit is the process section 16a in the image process section 16 in the embodiment or corresponds to a function in normal image formation of the image processing section 11 as in the seventh embodiment shown in FIG. 17.

Preferably, the process unit reduces the data amount so that a post-compressed image has a resolution of 100 dpi or 50 dpi. That is, as in the description of the-embodiment, most output images of normal image formation apparatus have a resolution of 400 dpi or 600 dpi, thus processing for reducing to 100 dpi or 50 dpi is easy to perform. The data amounts corresponding to the resolutions would make it possible to use 1 MB SRAM as the storage unit.

The storage unit may have a plurality of storage areas and the comparison unit may perform comparison processing at the same time based on the non-reproducible images stored in the storage areas. This configuration is realized in the sixth embodiment shown in FIG. 15. Since parallel processing is performed for a plurality of non-reproducible image data pieces, a determination can be made at higher speed.

According to another aspect of the invention, there is provided an image formation apparatus comprising an non-reproducible image formation preventing apparatus having any one of the above structures and having a function of stopping normal print processing if a received image is an non-reproducible image based on the determination result output from the non-reproducible image formation preventing apparatus.

The present invention also relates to a copier containing the image formation apparatus. Also, particularly, the present invention is effective as countermeasures against mass production of forgeries in the image formation apparatus in a personal computer apparatus.

Next, preferred embodiments according to the present invention will be described as follows referring to the accompanying drawings.

FIG. 1 shows an non-reproducible image formation preventing apparatus and an image formation apparatus according to a first embodiment of the invention. As shown here, an image processing section (controller) 11 receives image data sent from a personal computer, etc. The image processing section 11 adjusts the image data so that hue, saturation, lightness, and the like are output correctly, and converts the data into a format fitted to an engine section at the following stage for performing print processing. The image processing section 11 sends the resultant image information via an interface 12 to the engine section (not shown), which then prints an image on paper, etc., based on the image information. The structure of this line is that of a general image formation apparatus and therefore will not be discussed here.

In the embodiment, a recognition section 15 is connected in parallel with the image processing section 11. Image data sent from a personal computer, etc., is fed into the recognition section 15, which then performs predetermined recognition processing based on the received image data. Various recognition algorithms disclosed in Unexamined Japanese Patent Publication (kokai) No. Hei. 6-246064, etc., for example, can be applied to the specific recognition processing. As an example, whether or not a specific pattern or mark is contained in the recognized image is determined. If it is contained, a detection signal is sent to the image processing section 11. The recognition processing is realized by software; low-speed, but highly accurate recognition can be executed.

Upon reception of the detection signal, the image processing section 11 stops the subsequent image formation or processes the formed image (degrades the resolution, fills in one color, or prints a specific mark, etc., overlapping the image) for protecting against forgery.

Further, in the embodiment, the input image data is also fed into an image process section 16, which has a function for transferring the received image data to a storage section 17 and a comparison/determination section 18. At this time, preferably data reduction processing of predetermined compression, etc., described later is performed for decreasing the number of data pieces to transfer the data. However, in the invention, such process need not necessarily be executed and the received data may be transferred intact. In this case, a processing section having a simple transfer function with no process function is provided.

Figure 2:
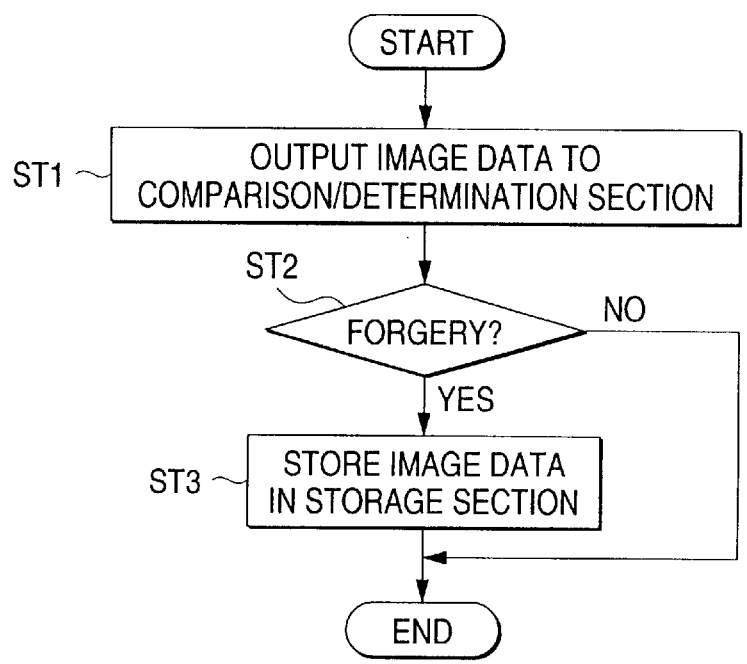
FIG. 2 is a flowchart to show the function of an image process section.

The above-described detection signal output from the recognition section 15 is also fed into the image process section 16, which then stores data in the storage section 17 based on the detection signal. The specific function is as in a flowchart shown in FIG. 2. That is, when getting image data sent from the personal computer, the image process section 16 sends the gotten image data (the current image being processed) to the comparison/determination section 18 and stores the data therein at step ST1. The image process section 16 determines whether or not the image data being processed is a copy-inhibited article, namely, whether or not a forging act is conducted based on the fact as to whether or not a detection signal is sent from the recognition section 15 at step ST2. If a forging act is conducted, the image process section 16 stores the image data in the storage section 17 at step ST3. If normal image formation with no forgery is applied, the image process section 16 does not store the image in the storage section 17 and terminates the processing for the next image formation.

The comparison/determination section 18 compares the image data stored in the storage section 17 with the current image data being processed, given from the image process section 16. Then the comparison and determination section 18 finds the agreement degree indicating the degree of the match therebetween. If the agreement degree is equal to or greater than a preset threshold value, the comparison/determination section 18 determines that a forging act is conducted, and sends a detection signal to the image processing section 11. When the detection signal is sent from the comparison/determination section 18, the image processing section 11 also performs forgery prevention processing similar to that performed when the detection signal is sent from the recognition section 15 described above. In addition to an agreement degree calculation algorithm in a recognition apparatus installed in a conventional copier for protecting against unauthorized duplication, various recognition algorithms can be applied to the agreement degree calculation algorithm in the embodiment.

The two data pieces compared by the comparison/determination section 18 are both digital data. Accordingly, even if the comparison/determination section 18 is constructed by software to reduce costs, calculation of the agreement degree and in turn determination as to whether or not a forging act is conducted can be carried out at high speed. Since the comparison processing can also be performed easily, if the comparison/determination section 18 is constructed by hardware, the costs are not extremely increased.

According to the embodiment, the processing speed of the recognition section 15 is low. Thus, image formation processing is executed in the image processing section 11 at the same time as the recognition processing is performed. When the recognition section 15 determines that the image formation is non-reproducible, the image processing is already advanced; at bad timing. Consequently, it is feared that one sheet may be printed out. However, the image data once recognized by the recognition section 15 is stored in the storage section 17, so that the comparison/determination section 18 can perform processing at high speed at the second time and later for protecting against the subsequent forging act.

The apparatus of the embodiment that can block print of at least two or more sheets becomes useful for protecting against forgery because a large amount of print processing is executed in many cases in a forging act. Further, the non-reproducible image data involved in forgery is stored in the storage section 17. Thus, for example, when normal printout is stopped according to the recognition of the recognition section 15, if the print is once canceled and an image involving no problem is printed on several sheets and then again an attempt is made to conduct a forging act, a detection signal is output from the comparison/determination section 18 because the previous non-reproducible image is stored. Therefore, print can be blocked to protect against forgery reliably.

In the embodiment, a detection signal is not output when a complete match is found. Instead, the agreement degree is calculated and when the agreement degree is equal to or greater than the given reference value, a detection signal is output. Thus, for example, if falsification such as a slight color variation is executed, it is made possible to detect the falsification reliably.

Further, in the embodiment, the agreement degree is used to recognize the image having a given reference value (threshold value) or more as the image to be detected. The threshold value may be preset as a fixed value for the apparatus or may be changed in setting. To change the threshold value, direct input with a switch, etc., (not shown) (a) or direct setting through the image processing section 11 (b) is enabled, for example, as indicted by phantom lines in FIG. 1, whereby the power of the forgery prevention function can be adjusted.

Input data may be used directly as the image data stored in the storage section 17 and determined by the comparison/determination section 18. However, a very large capacity is required. For example, an A4-size 600-dpi image would become 35-Mbit data and multivalued data of three colors would become 860 Mbits. Then, the data amounts are decreased by the image process section 16 for decreasing the storage capacity and lessening the number of data pieces to be compared. Therefore, processing is accomplished at higher speed. Further, since input image data is digital data output from a personal computer, etc., it is expected that the original data of the formed image matches or almost matches each time. Therefore, if the data amount is drastically reduced by compression, etc., whenever necessary, the recognition accuracy can be held high. As a specific reduction method, various compression techniques can be used for image compression. In addition, for example, the following can also be used.

Figure 3:
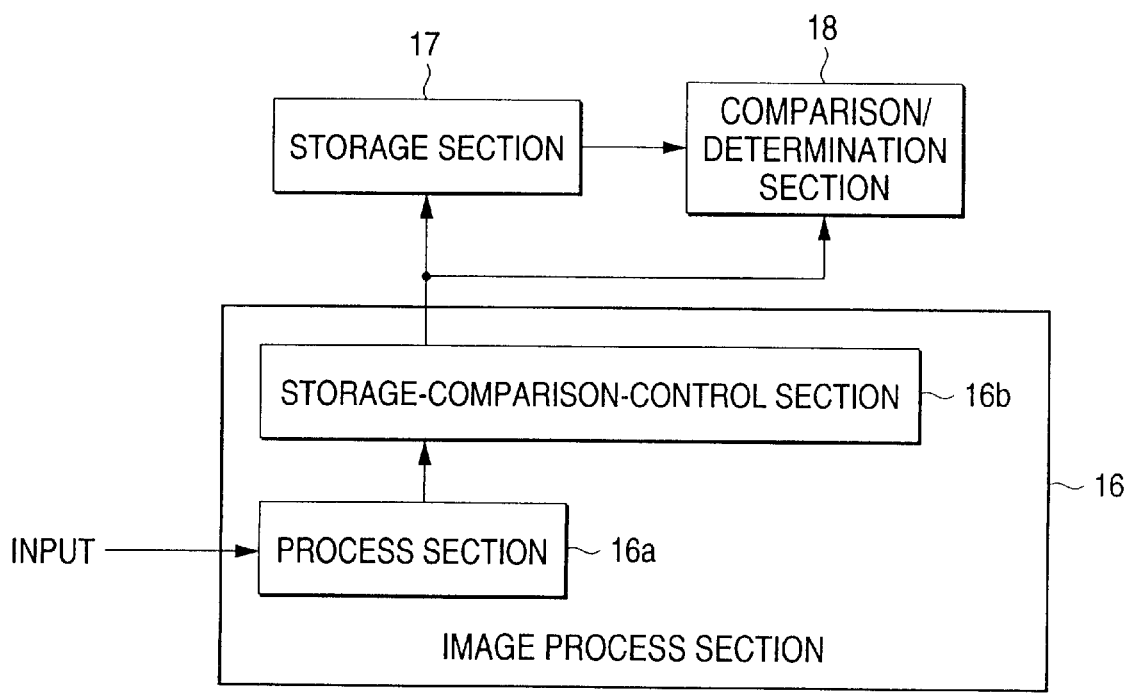
FIG. 3 is a block diagram to show the main part of a modified example of the first embodiment of the invention.

First, as shown in FIG. 3, the image process section 16 contains a process section 16a for reducing the image data amount and a storage-comparison-control section 16b for distributing the image data compressed by the process section 16a to the storage section 17 and the comparison/determination section 18. The storage-comparison-control section 16b has a function of realizing the flowchart shown in FIG. 2.

The process section 16a can adopt a method of decreasing the image data amount by performing thinning-out processing as shown in FIGS. 4A and 4B. FIG. 4A shows given data and the hatched parts are removed for thinning out the data half in the X direction and half in the Y direction. In this method, the data amount can be reduced to a quarter as shown in FIG. 4B.

Figures 5A, 5B:
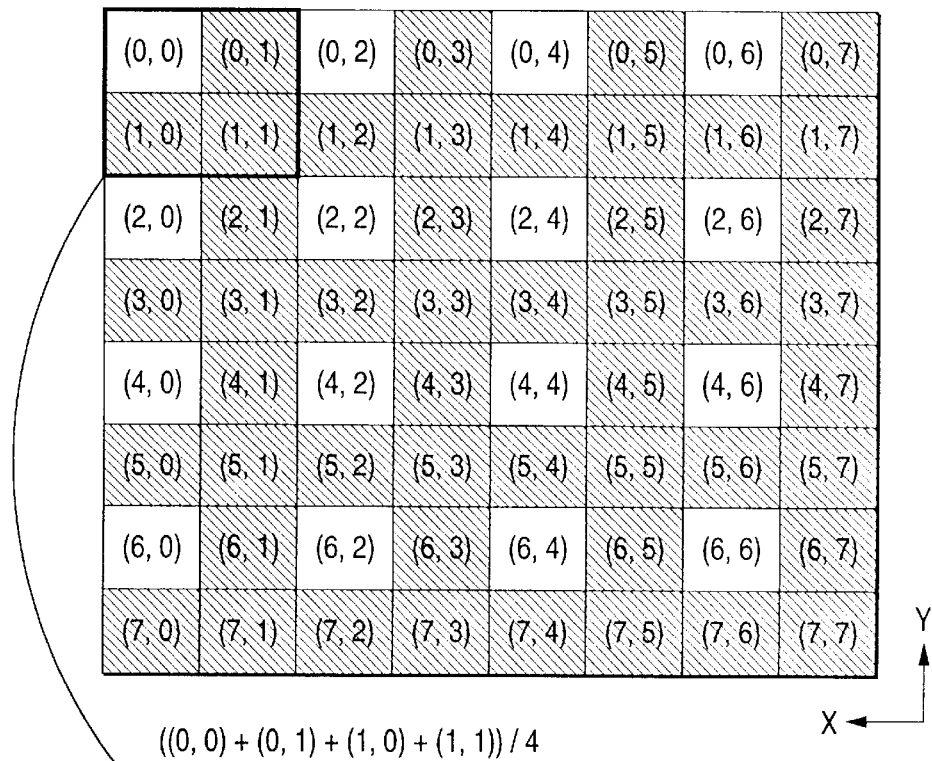
FIGS. 5A and 5B are drawings to describe the function of the process section in FIG. 3.

As another method, averaging is executed as shown in FIGS. 5A and 5B. That is, in the example in FIGS. 4A and 4B, simple thinning out is executed, but averaging (adopting the average value of four pixels as a new pixel value) can also be executed for leaving the information amount of the image data in the thinning out. Then, the accuracy can be held as compared with the example in FIGS. 4A and 4B. In the example shown in FIGS. 5A and 5B, the values of four pixels are averaged, but the values of 16 pixels may be averaged or processing of averaging in horizontal scanning (X direction) and simple thinning out in vertical scanning (Y direction) may be adopted. After averaging, binarization, etc., can also be further executed for further decreasing the data amount.

FIGS. 6A and 6B shows still another method. As well known, color image data is represented in RGB or YMCK. Therefore, image data also exists for three colors. Then, the colors are merged into one color (for example, monochrome data). Consequently, the data amount can be reduced to a third or a quarter. Of course, this processing may be used in combination with the methods of decreasing the number of bits, such as simple thinning out, averaging and thinning out, and binarization described above.

Generally, the resolution of an image formation apparatus is 400 dpi or 600 dpi. Therefore, to thin out image data, if the resolution is converted into 100 dpi or 50 dpi, the data amount can be decreased with a reasonable resolution maintained. For example, if an A4-size 600-dpi image is multi-valued data, it becomes a data amount of 35 MB per color, but can be reduced to 35 Mbits by executing averaging and binarization. Further, if the resolution is converted into 100 dpi, the data amount is reduced to 1 Mbits; if the resolution is converted into 50 dpi, the data amount is reduced to 250 kbits. Therefore, it can be acknowledged that the apparatus can be realized easily with general-purpose memory.

Figure 7:
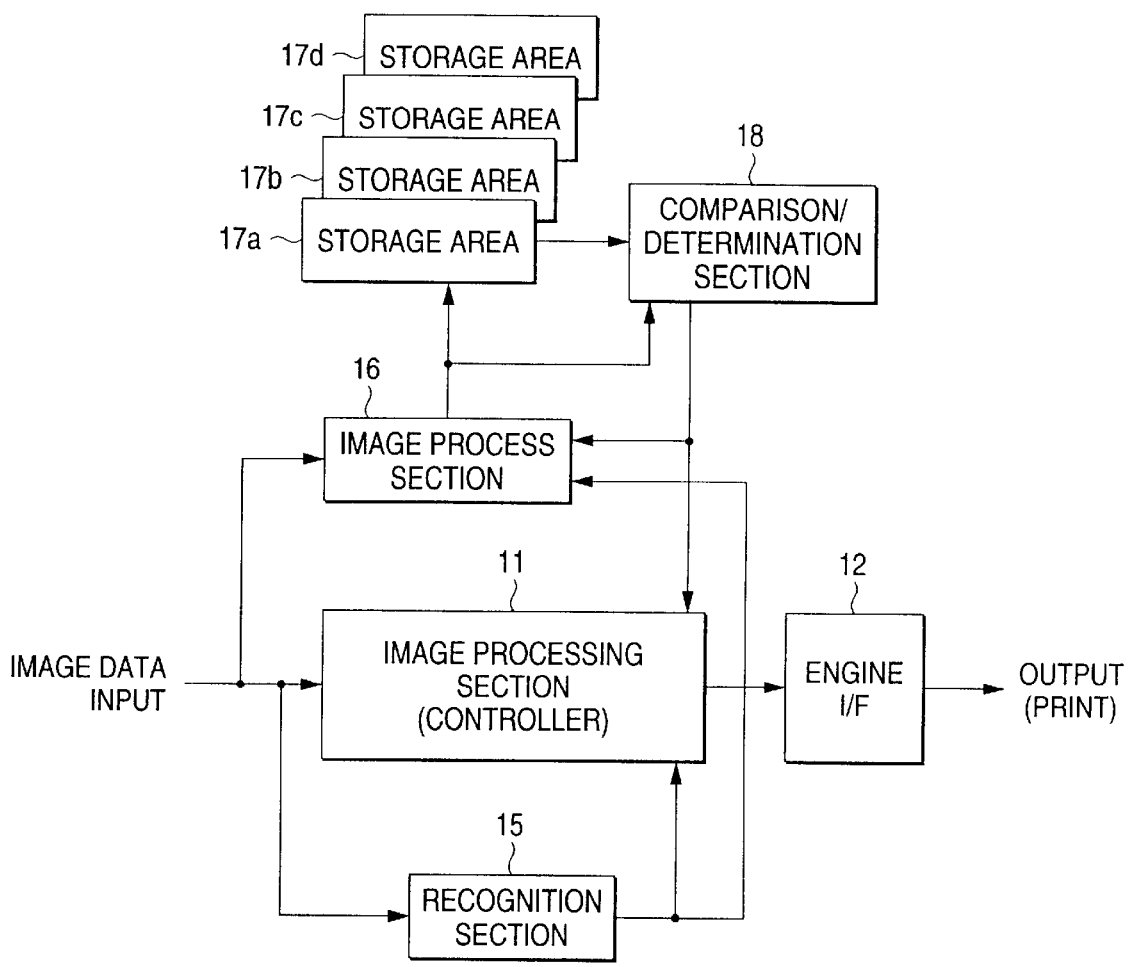
FIG. 7 is a block diagram to show a second embodiment of the invention.

FIG. 7 shows a second embodiment of the invention. As seen by comparison with FIG. 1, in the second embodiment, a storage section 17 has storage areas 17a to 17d corresponding to a plurality of planes and can store image data of a plurality of planes. Accordingly, prevention against forgery is enabled more reliably.

That is, each time an image is formed, recognition processing of a recognition section 15 and determination processing of a comparison/determination section 18 are performed in parallel. When a detection signal from the recognition section 15 is output, an image process section 16 stores the current image data being processed in a predetermined area of the storage section 17. If an additional detection signal is output from the recognition section 15 with non-reproducible images stored in all storage areas, the oldest non-reproducible image is replaced with a new non-reproducible image. Therefore, a plurality of the most recent non-reproducible images (in the example shown in the drawing, four images) are always stored.

The comparison/determination section 18 compares each of the non-reproducible images stored in the storage areas 17a to 17d with the current image data being processed. If any non-reproducible image matches or is similar to the current image data (if the agreement degree therebetween is equal to or greater than a given value), the comparison/ determination section 18 outputs a detection signal.

The relationship between the recognition (determination) result of the recognition section 15 and data storage in the storage section 17 in the embodiment is as shown in FIG. 8. In this drawing, it is assumed that the storage section 17 stores two images in the storage areas 17a and 17b for convenience of the description. The same is also applied if the storage section 17 stores three or more images. Accordingly, if print is once canceled and an image involving no problem is printed on several sheets and then again an attempt is made to conduct a forging act, print cannot be executed because the previous non-reproducible images are stored, as in the first embodiment. This means that the forging act can be blocked. Moreover, in the embodiment, a plurality of non-reproducible images are stored. Thus, if an attempt is made to conduct an invalid act while one forgery is replaced with another, it can be blocked effectively if the invalid data corresponding to the forgeries is stored in the storage areas 17a to 17d. Other components, functions, and effects are similar to those previously described in the first embodiment and therefore parts identical with or similar to those previously described are denoted by the same reference numerals in FIG. 7 and will not be discussed again.

FIG. 9 shows a main part of a third embodiment of the invention, and more particularly is a flowchart to show the function of an image process section 16. The function of the image process section 16 in the second embodiment is changed as shown in FIG. 9, so that the third embodiment is formed. The third embodiment is thus based on the second embodiment, but need not be limited to it. The third embodiment can be applied to any apparatus if its storage section contains storage areas corresponding to a plurality of planes.

That is, in the second embodiment, if the recognition 15 determines that image data is invalid and outputs a detection signal, the non-reproducible image data is stored in the storage section 17. Thus, there is a possibility that the same image as the non-reproducible image already stored in any area of the storage section 17 will be again stored in another storage area. Then, the types of non-reproducible images that can be detected at high speed are lessened. In the third embodiment, if even the image determined invalid by a recognition section 15 is the same as an image already stored, storage update is not executed. Accordingly, all areas of a storage section is prevented from being filled with the same image.

Specifically, upon reception of input image data, an image process section 16 sends the image data to a comparison/ determination section 18 at step S11 as in the above- described embodiments. At this time, the image process section 16 performs data amount reduction processing, etc., as required.

Next, the image process section 16 determines whether or not a forging act is conducted based on the fact as to whether or not a detection signal from the recognition section 15 exists at step ST12. If no detection signal exists (a forging act is not conducted), the image process section 16 terminates the processing for the next processing. On the other hand, if a detection signal is received (a forging act is conducted), the image process section 16 goes to step ST13 and determines whether or not the image data is the same as the past non-reproducible image. Here, various determination methods are possible; as an example, whether or not the image data is the same as the past non-reproducible image can be determined based on whether or not a detection signal from the comparison/determination section 18 exists. That is, if a detection signal is output from each of the recognition section 15 and the comparison/determination section 18, it can be recognized that the image is also stored in the storage section 17 and is the same non-reproducible image as the past one. Conversely, if a detection signal is output only from the recognition section 15, it can be recognized that the image is a new non-reproducible image. If the image is a new non-reproducible image different from the past one, the image data is stored in the storage section.

The invention is not limited to the shown flowchart. For example, as the detection signal receiving timing, a detection signal from the comparison/determination section 18 is earlier than a detection signal from the recognition section 15 in many cases. Thus, if a detection signal is output from the comparison/determination section 18, processing of the image process section 16 may be terminated. If a detection signal is output from the recognition section 15 when no detection signal is output from the comparison/ determination section 18, the image data may be stored in the storage section.

The relationships (state transition) among the recognition (determination) results of the recognition section 15 and the comparison/determination section 18 and data storage in the storage section 17 in the embodiment are as shown in FIG. 10. In the drawing, it is assumed that the storage section 17 stores two images in storage areas 17a and 17b for convenience of the description. However, the same is also applied if the storage section 17 stores three or more images.

As seen in the drawing, since an non-reproducible image is detected at the first time, it is stored in the storage area 17a. Since a normal image is detected at the second time, it is not stored and the processing is terminated. At the third time, an non-reproducible image is detected, but a detection signal is not output from the comparison/determination section 18. Thus, the non-reproducible image is a new non-reproducible image not stored in the storage section 17 and therefore is stored in the storage area 17b. Since an non-reproducible image is detected and moreover a detection signal is also output from the comparison/determination section 18 at the fourth time, the non-reproducible image is not stored in the storage section. Further, at the sixth time, the recognition section 15 detects an invalid act, but the comparison/determination section 18 does not detect an illegal act, thus the image can be determined a new non-reproducible image. Then, the old non-reproducible image stored in the store area 17a is replaced with the current non-reproducible image detected (image 6 in the drawing). Other components, functions, and effects are similar to those previously described in the first and second embodiments and therefore parts identical with or similar to those previously described are denoted by the same reference numerals in FIG. 9 and will not be discussed again.

Figure 11:
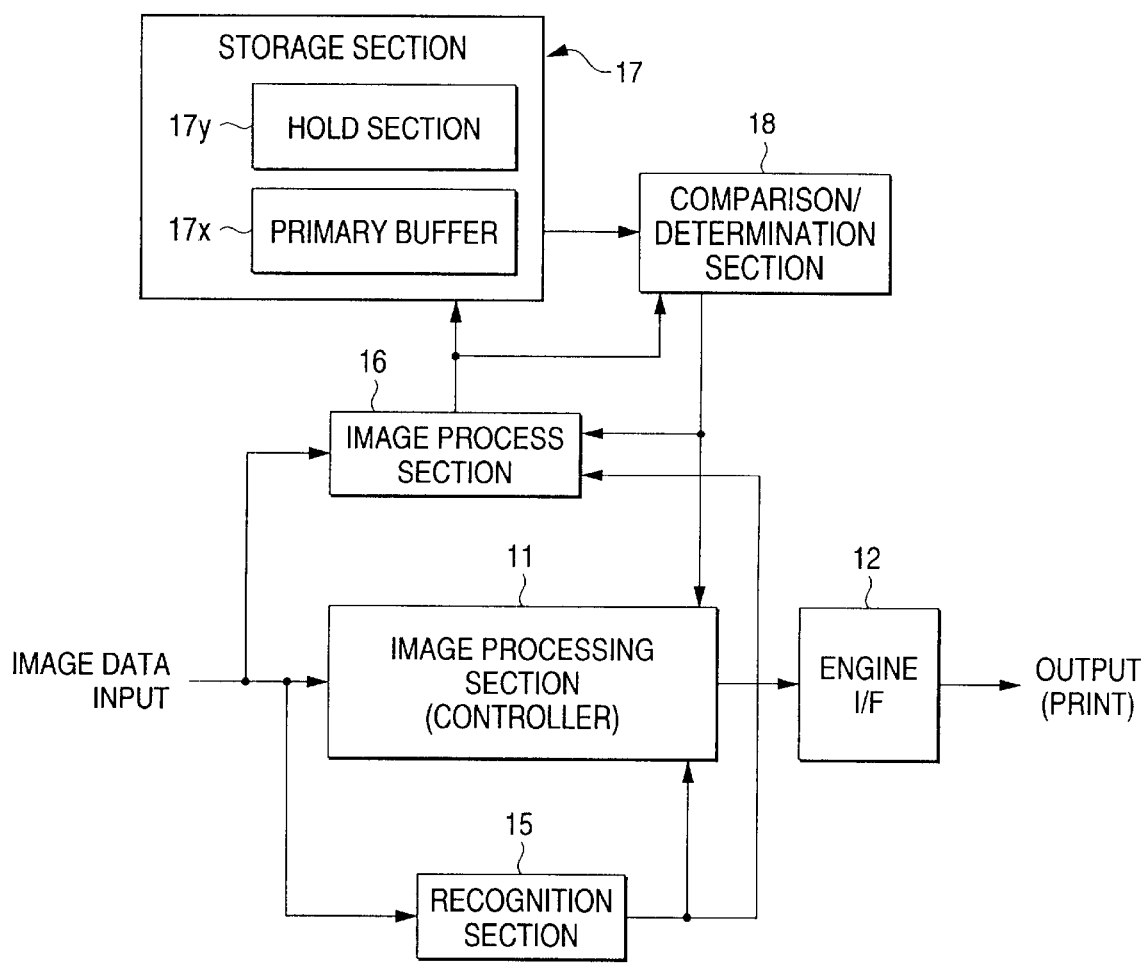
FIG. 11 is a block diagram to show a fourth embodiment of the invention.

FIG. 11 shows a fourth embodiment of the invention. In the above-described embodiments, if the recognition section 15 outputs a detection signal, the image process section 16 stores the non-reproducible image data in the storage section 17 and holds the image data until it receives a detection signal. In contrast, in the fourth embodiment, a storage section 17 is provided with a primary buffer 17x and a hold section 17y and input image data temporarily stored and held in the image process section 16 in the above-described embodiments is held in the primary buffer 17x of the storage section 17.

That is, an image process section 16 in the fourth embodiment stores received image data in a comparison/ determination section 18 and the primary buffer 17x of the storage section 17 as it is or after processing the image data. The comparison/determination section 18 compares an non-reproducible image stored in the hold section 17y of the storage section 17 with received input image data to determine whether or not they match. If a detection signal is output from a recognition section 15, the image data stored in the primary buffer 17x is transferred to the hold section 17y for the next determination. In this case, in the example shown in the drawing, if the image process section 16 receives the detection signal, it accesses the storage section 17 and transfers the image data to the hold section 17y. Stored data can be updated, etc., smoothly by providing the primary buffer. Other components, functions, and effects are similar to those previously described in the first to third embodiments and therefore parts identical with or similar to those previously described are denoted by the same reference numerals in FIG. 11 and will not be discussed again. A plurality of hold sections 17y may be provided and each time an illegal or forging act is detected, the non-reproducible image is stored in the hold section in order and if non-reproducible images are stored in all hold sections, then the oldest non-reproducible image may be replaced with a new non-reproducible image in order, needless to say.

Figure 12:
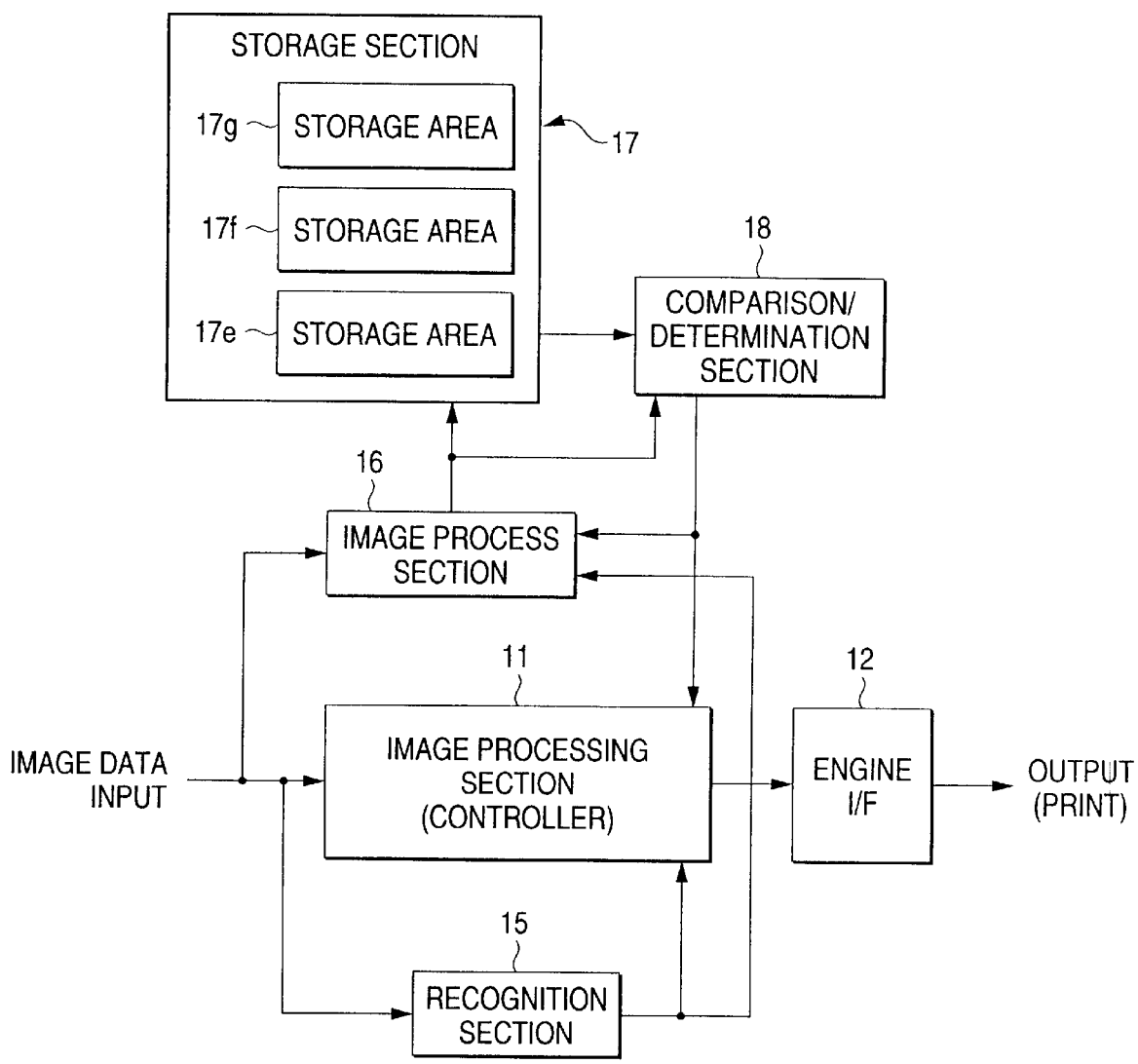
FIG. 12 is a block diagram to show a fifth embodiment of the invention.

FIGS. 12 and 13 show a fifth embodiment of the invention. In the embodiment, an improvement on storage section 17 is intended. That is, a storage section 17 is provided with a primary buffer as in the fourth embodiment. The fifth embodiment differs from the fourth embodiment in that the storage section 17 has three storage areas which can store images of three planes and function each as a primary buffer or a hold buffer. That is, in the fourth embodiment, the primary buffer 17x and the hold section 17y are fixed, and if an non-reproducible image is detected, image data is transferred from the primary buffer 17x to the hold section 17y. In the fifth embodiment, one storage area always serves as the primary buffer and the remaining two storage areas serve as hold buffers. If the image data being processed, stored in the primary buffer becomes an non-reproducible image, the primary buffer is changed to a hold buffer and the non-reproducible image stored therein is used as the reference image in the subsequent comparison and determination processing. This eliminates the need for image data transfer between the storage areas. Other components, functions, and effects are similar to those previously described in the first to fourth embodiments and therefore parts identical with or similar to those previously described are denoted by the same reference numerals in FIG. 12 and will not be discussed again.

The relationships (state transition) among the recognition (determination) results of a recognition section 15 and a comparison/determination section 18 and data storage in the storage section 17 in the embodiment are as shown in FIG. 13. That is, when the first image formation is executed, a storage area 17e becomes the primary buffer and the image being processed is temporarily stored in the storage area 17e. If the image being processed is recognized as an non-reproducible image according to the recognition result of the recognition section 15, when the second image processing is performed, the storage area 17e becomes a hold buffer and another storage area 17f becomes the primary buffer, thus the image being processed (image 2 in the drawing) is temporarily stored in the storage area 17f. The image stored in the storage area 17e (image 1 in the drawing) is used as the reference non-reproducible image in determination processing of the comparison/determination section 18. When non-reproducible images (images 1 and 3 in the drawing) are stored in the storage areas 17e and 17f as the two hold buffers as at the fifth time, if an additional image is determined invalid, a storage area 17g as the primary buffer in which the image determined invalid (image 5 in the drawing) becomes a hold buffer at the sixth time. Accordingly, the storage area 17e, the oldest hold buffer, becomes a new primary buffer and the image being processed (image 6 in the drawing) is rewritten into the storage area 17e.

The number of planes that can be stored in the storage section is four in FIG. 7 for convenience, but may be at least three. That is, if the object to be protected against an illegal or forging act is a bill, both print sides exist, thus the number of types of non-reproducible images to be stored and held is two. Therefore, the necessity for the storage section to have areas at least for two planes occurs and the storage section has areas for three planes (three types of images), whereby allowance can be made and the possibility that the apparatus can protect against an illegal act is raised.

On the other hand, the efficient number of planes is $2^{n-1}$. From this viewpoint, the minimum number of hold buffers (hold sections) is also three. The reason why the number of hold-buffers (hold sections) preferably is as many planes as $2^{n-1}$ will be explained as follows.

If a primary buffer is built in the storage section 17, it is preferred in the point of processing efficiency. If the sum total of temporary and hold buffers is $2^n$, control is facilitated because of chip select, address, etc., and memory can be used efficiently. Since the primary buffer is used for one plane, preferably the number of storage areas as the hold buffers (hold sections) is made as many planes as $2^{n-1}$ (three planes at the minimum).

Figure 14:
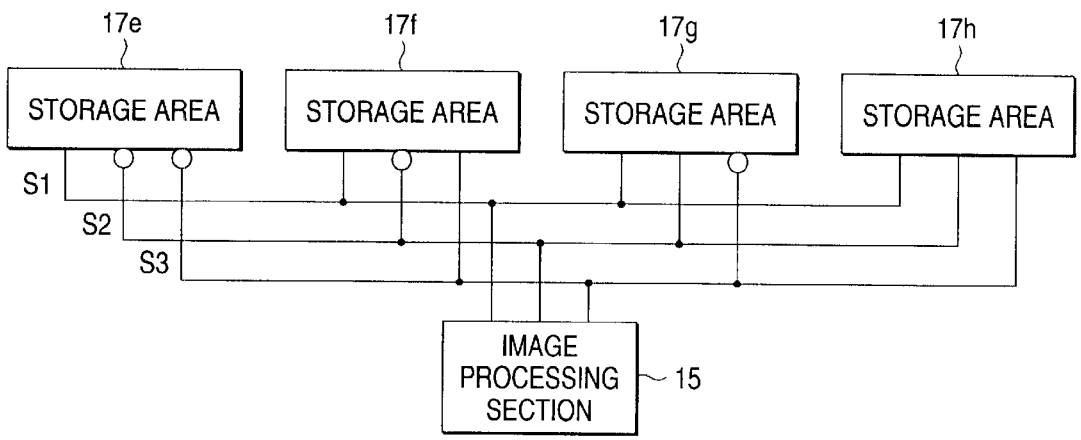
FIG. 14 is a block diagram to show a modified example of the fifth embodiment of the invention.

FIG. 14 shows a configuration example applied when the storage section 17 has three hold buffers. S1 denotes the low-order address part, S2 denotes the second most significant bit of the address, and S3 denotes the most significant bit of the address. Thus, the four storage areas or the storage section can be controlled only with the two high-order bits of the address and control can be easily performed containing the above-described primary buffer change. Other components, functions, and effects are similar to those previously described in the embodiments and therefore parts identical with or similar to those previously described are denoted by the same reference numerals in FIG. 14 and will not be discussed again.

Figure 15:
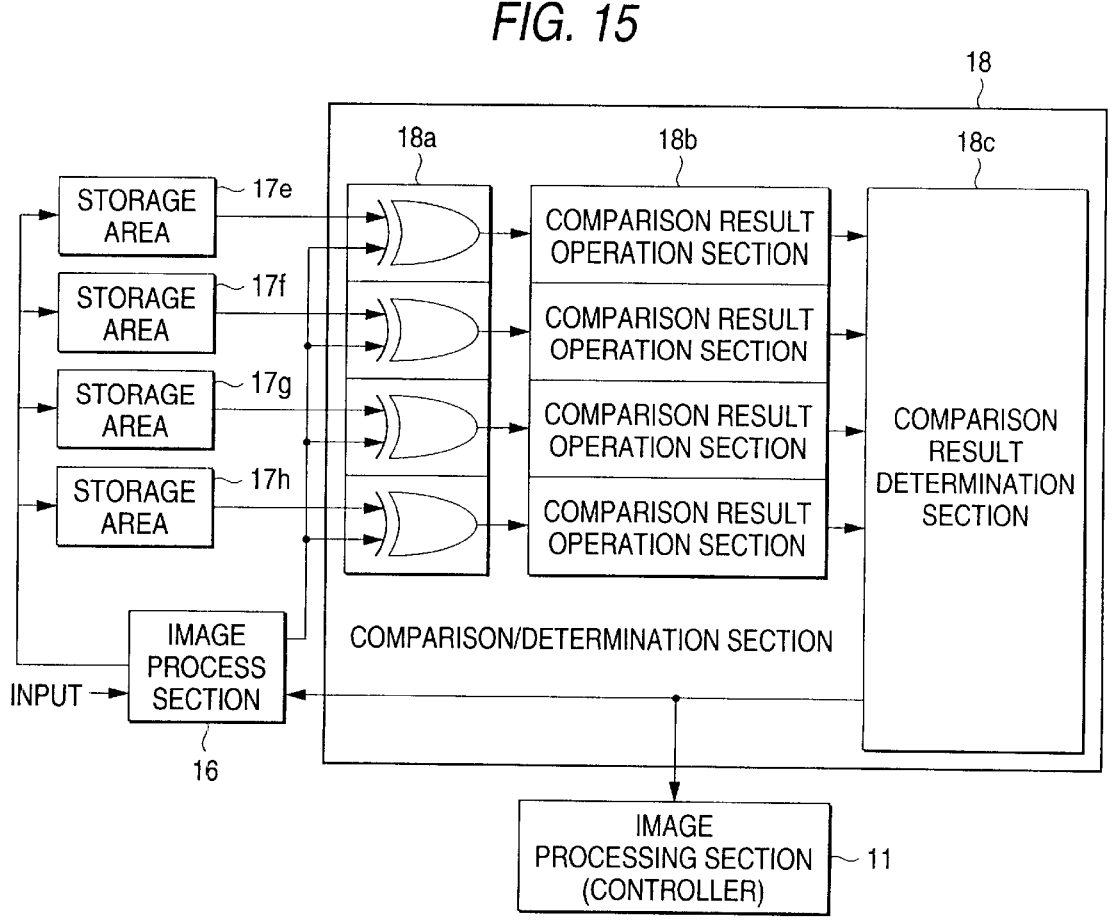
FIG. 15 is a block diagram to show a sixth embodiment of the invention.

FIG. 15 shows a sixth embodiment of the invention. Also in this embodiment, storage areas 17e to 17h are provided for storing a plurality of non-reproducible images and one of the storage areas is used as a primary buffer and the remaining three storage areas are used as hold buffers. That is, in this point, the sixth embodiment is the same as the fifth embodiment.

In the sixth embodiment, comparison and determination processing performed by a comparison/determination section 18 based on non-reproducible images stored in a storage section 17 containing the storage areas 17e to 17h is performed for a plurality of non-reproducible images at the same time. Specifically, four comparators 18a are placed in parallel on the input side matching the number of the storage areas, outputs of the comparators 18a are fed into comparison result operation sections 18b provided in a one-to-one correspondence with the comparators 18a, and outputs of the four comparison result operation sections 18b are fed into a comparison result determination section 18c. Then, the determination result of the comparison result determination section 18c is output to an image process section 16 and an image processing section 11.

Each comparator 18a is a two-input and one-output circuit for determining whether or not two inputs match. Output of the corresponding storage area 17e–17h of the storage section 17 and data based on the current input image being processed (formed) output from the image process section 16 are fed into the comparator 18a. If the two inputs match (may match completely or may match within a given tolerance), a detection signal is output. For the non-reproducible image data stored in the comparison area and the image data output from the image process section 16, the data concerning the same coordinate value is output in sequence while synchronization is established.

The comparison result operation section 18b can perform various types of operations. For example, it counts the number of detection signals output from the corresponding comparator 18a, because the number of times a detection signal is output is increased as a match with an non-reproducible image is found. Therefore, the count of the comparison result operation section 18b becomes the value corresponding to the match degree with the non-reproducible image; the greater the numeric value, the higher is the match degree.

Then, the comparison result determination section 18c gets the count result of each comparison result operation section 18b. If any one exceeds a given threshold value, the comparison result determination section 18c determines that the image is an non-reproducible image, and outputs a detection signal. Upon reception of the detection signal, the image processing section 11 performs predetermined forgery prevention processing. If the image process section 16 receives the detection signal, at least the current image being processed is the same as the non-reproducible image stored in the storage buffer. Thus, it is not necessary to write all image information into the primary buffer or convert the primary buffer into a hold buffer. Then the image process section 16 may stop the subsequent processing (may continue processing to the end, of course).

Figure 16:
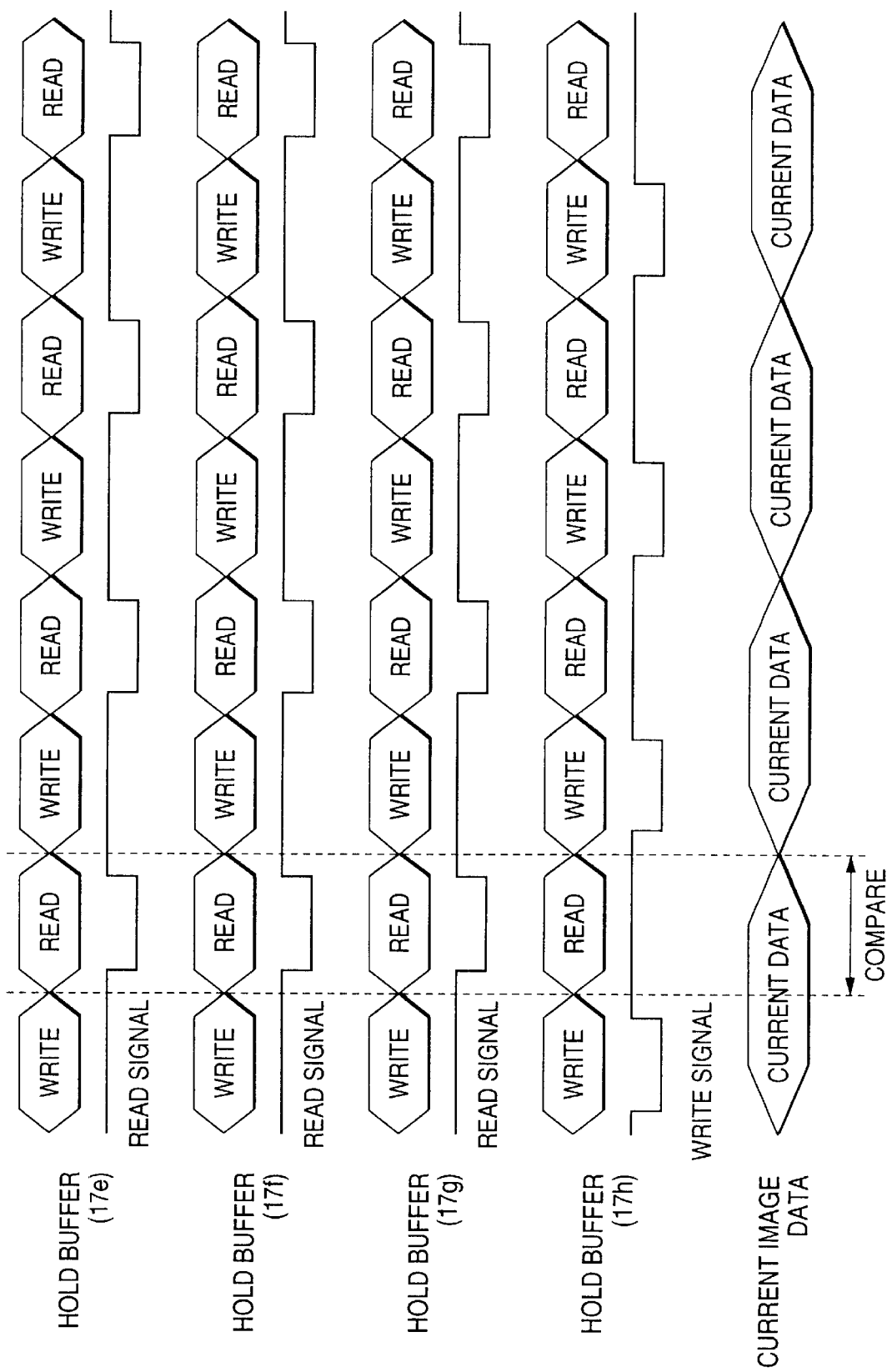
FIG. 16 is a timing chart to show an example of reading and writing data from and into a storage section in the sixth embodiment of the invention.

A timing chart applied when such processing is performed becomes, for example, as shown in FIG. 16. In this example, in the first half when data of one pixel or one unit of a compressed image is sent, write into the primary buffer 17 is executed and in the second half, read from each hold buffer is executed. As the read is executed, the data is transferred to the comparators 18a at the following stage.

If a recognition section detects an non-reproducible image, as in the above-described embodiments, the image data stored in the primary buffer is stored in the hold buffer and is used for the subsequent determination processing of the comparison/determination section 18. In this case, the current primary buffer 17h may be changed to a hold buffer as in the fifth embodiment or the data may be transferred to another predetermined hold buffer as in the third embodiment. Other components, functions, and effects are similar to those previously described in the first to fifth embodiments. Therefore, parts identical with or similar to those previously described are denoted by the same reference numerals in FIGS. 15 and 16 and will not be discussed again.

Figure 17:
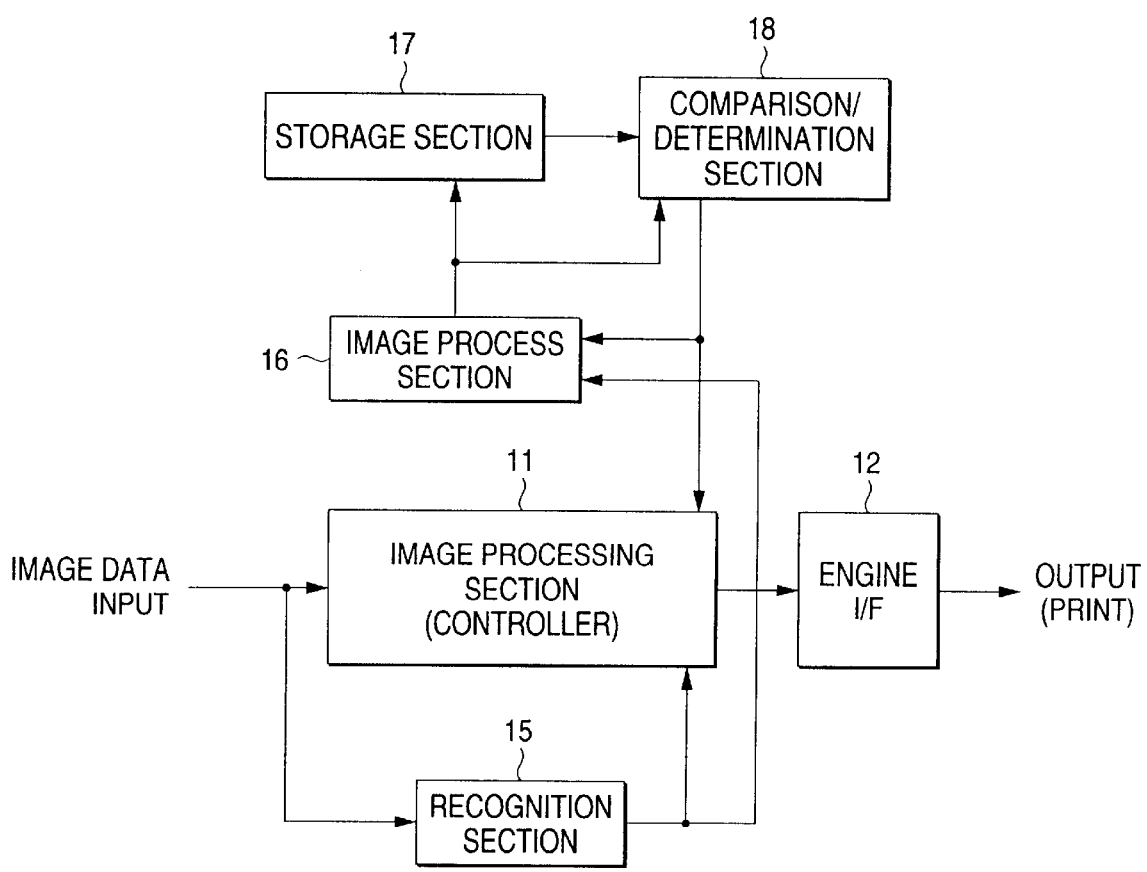
FIG. 17 is a block diagram to show a seventh embodiment of the invention.

FIG. 17 shows a seventh embodiment of the invention. In the embodiment, image data formed by an image processing section 11 is used as compressed image data stored in a storage section 17. That is, in an image processing apparatus, normally the image processing section 11 reduces the amount of data for use as engine section data. Then, if the image data formed by the image processing section 11 is used, an image process section 16 need not be provided with the process section 16a shown in FIG. 3, and non-reproducible image data can be compressed and stored in the storage section 17. Other components, functions, and effects are similar to those previously described in the first to sixth embodiments. Therefore, parts identical with or similar to those previously described are denoted by the same reference numerals in FIG. 17 and will not be discussed again.

On the other hand, in the above-described embodiments, it is advisable for the storage section 17 to be able to retain stored non-reproducible images if power of the image formation apparatus is turned off. This means that if the stored image is erased or is not retained when the power is turned off, it is made possible to turn off the power on purpose for printing non-reproducible images. Then, preferably the image formation apparatus is provided with a mechanism for retaining an image in the storage section 17 if the power is turned off for easily coping with such an illegal act. Specifically, a backup power supply is provided and if the main switch of the image formation apparatus is turned off, the image formation apparatus, namely, image data can be retained. Flash memory rather than such a backup power supply may be used.

Further, if the apparatus is adopted, an non-reproducible image is left in the storage section. Thus, for example, if it is made possible to read the data stored in the storage section in a special mode such as a serviceman mode, evidence as to an illegal act if conducted can be easily pinpointed and can also be used as evidence at the indicting time for a crime.

If the data stored in the storage section 17 cannot be erased if the power is turned off, unnecessary data can be prevented from being left at the recycling time, etc., by enabling data to be erased only in a special mode such as a serviceman mode.

In the above-described embodiments, application examples to image formation apparatus such as printers are given, but the invention is not limited to them and can also be applied to any other image formation apparatus such as a copier.

As described above, with the non-reproducible image formation preventing apparatus and the image formation apparatus according to the invention, the recognition section determines whether or not the image data is a print-inhibited article. At the subsequent printing time, in parallel with the recognition of the recognition section, the comparison section compares the image with a previously inhibited non-reproducible image and the determination section determines whether or not the image matches the non-reproducible image (a forging act is conducted). Thus, mass production of forgeries can be blocked and real-time processing is enabled. Therefore, the time required for image formation of print, etc., is not prolonged.

An non-reproducible image is held in the storage means, whereby evidence as to forgery can be left and the attempt to conduct a forging act can be blocked.

Particularly, in the image formation apparatus in a personal computer apparatus, it is expected that the original data of a formed image (electronic data) matches or almost matches each time, and a determination can also be made without dropping the recognition rate in detection of an illegal act with the comparison and determination units.

Thus, whether or not given image data is image data to be detected can be determined accurately in a short time as a whole without dropping the recognition rate in the simple configuration and moreover the processing time required for image formation of print, etc., is not prolonged and costs are reduced.

What is claimed is:

1. An non-reproducible image formation preventing apparatus installed in an image formation apparatus for executing image conversion of received image data in an image processing section and printing out an image based on provided image information, said non-reproducible image formation preventing apparatus comprising:

recognition means for performing recognition processing for the received image data, determining whether or not the image data is an non-reproducible image, and outputting the determination result to the image formation apparatus;

storage means for storing non-reproducible image data recognized as an non-reproducible image by said recognition means;

comparison means for comparing the non-reproducible image data stored in said storage means with image data based on input image data; and determination means for determining whether or not the input image is an non-reproducible image based on an output of said comparison means and outputting the determination result to the image formation apparatus.

2. The non-reproducible image formation preventing apparatus as claimed in claim 1 wherein said storage means has a plurality of storage areas for storing a plurality of non-reproducible images.

3. The non-reproducible image formation preventing apparatus as claimed in claim 1, wherein the image stored in said storage means is replaced with a most recent non-reproducible image.

4. The non-reproducible image formation preventing apparatus as claimed in claim 1, wherein if an non-reproducible image detected by said recognition means is already stored in said storage means, the image in said storage means is not updated.

5. The non-reproducible image formation preventing apparatus as claimed in claim 2, wherein the number of storage areas of said storage means for storing non-reproducible images is $2^{n-1}$.

6. The non-reproducible image formation preventing apparatus as claimed in claim 1, wherein said storage means is made up of a primary buffer for temporarily storing received image data and hold sections each for storing an non-reproducible image.

7. The non-reproducible image formation preventing apparatus as claimed in claim 6, wherein if said recognition means detects an non-reproducible image, the primary buffer is set to a hold section and any of the hold sections is used as a new primary buffer.

8. The non-reproducible image formation preventing apparatus as claimed in claim 1, further comprising process means for reducing the data amount of the input image data, wherein the image data compressed by the process means is stored in said storage means.

9. The non-reproducible image formation preventing apparatus as claimed in claim 8, where in the process means reduces the data amount so that a post-compressed image has a resolution of 100 dpi or 50 dpi.

10. The non-reproducible image formation preventing apparatus as claimed in claim 1, wherein said storage means has a plurality of storage areas, and said comparison means performs comparison processing at the same time based on the non-reproducible images stored in the storage areas.

11. An image formation apparatus comprising:

an non-reproducible image formation preventing apparatus recognition means for performing recognition processing for the received image data, determining whether or not the image data is an non-reproducible image, and outputting the determination result to the image formation apparatus; storage means for storing non-reproducible image data recognized as an non-reproducible image by said recognition means; comparison means for comparing the non-reproducible image data stored in said storage means with image data based on input image data; and determination means for determining whether or not the input image is an non-reproducible image based on an output of said comparison means and outputting the determination result to the image formation apparatus; and stopping means for stopping normal print processing if a received image is an non-reproducible image based on the determination result output from the non-reproducible image formation preventing apparatus.

12. The image formation apparatus as claimed in claim 11, wherein said storage means has a plurality of storage areas for storing a plurality of non-reproducible images.

13. The image formation apparatus as claimed in claim 11, wherein the image stored in said storage means is replaced with a most recent non-reproducible image.

14. The image formation apparatus as claimed in claim 11, wherein if an non-reproducible image detected by said recognition means is already stored in said storage means, the image in said storage means is not updated.

15. The image formation apparatus as claimed in claim 12, wherein the number of storage areas of said storage means for storing non-reproducible images is $2^{n-1}$.

16. The image formation apparatus as claimed in claim 11, wherein said storage means is made up of a primary buffer for temporarily storing received image data and hold sections each for storing an non-reproducible image.

17. The image formation apparatus as claimed in claim 16, wherein if said recognition means detects an non-reproducible image, the primary buffer is set to a hold section and any of the hold sections is used as a new primary buffer.

18. The image formation apparatus as claimed in claim 11, further comprising process means for reducing the data amount of the input image data, wherein the image data compressed by the process means is stored in said storage means.

19. The image formation apparatus as claimed in claim 18, wherein the process means reduces the data amount so that a post-compressed image has a resolution of 100 dpi or 50 dpi.

20. The image formation apparatus as claimed in claim 11, wherein said storage means has a plurality of storage areas, and said comparison means performs comparison processing at the same time based on the non-reproducible images stored in the storage areas.

* * * * *